April 6, 1926. 1,579,317
R. HERVIG
DRILL FLUTE MILLING MACHINE
Filed March 23, 1922   3 Sheets-Sheet 3
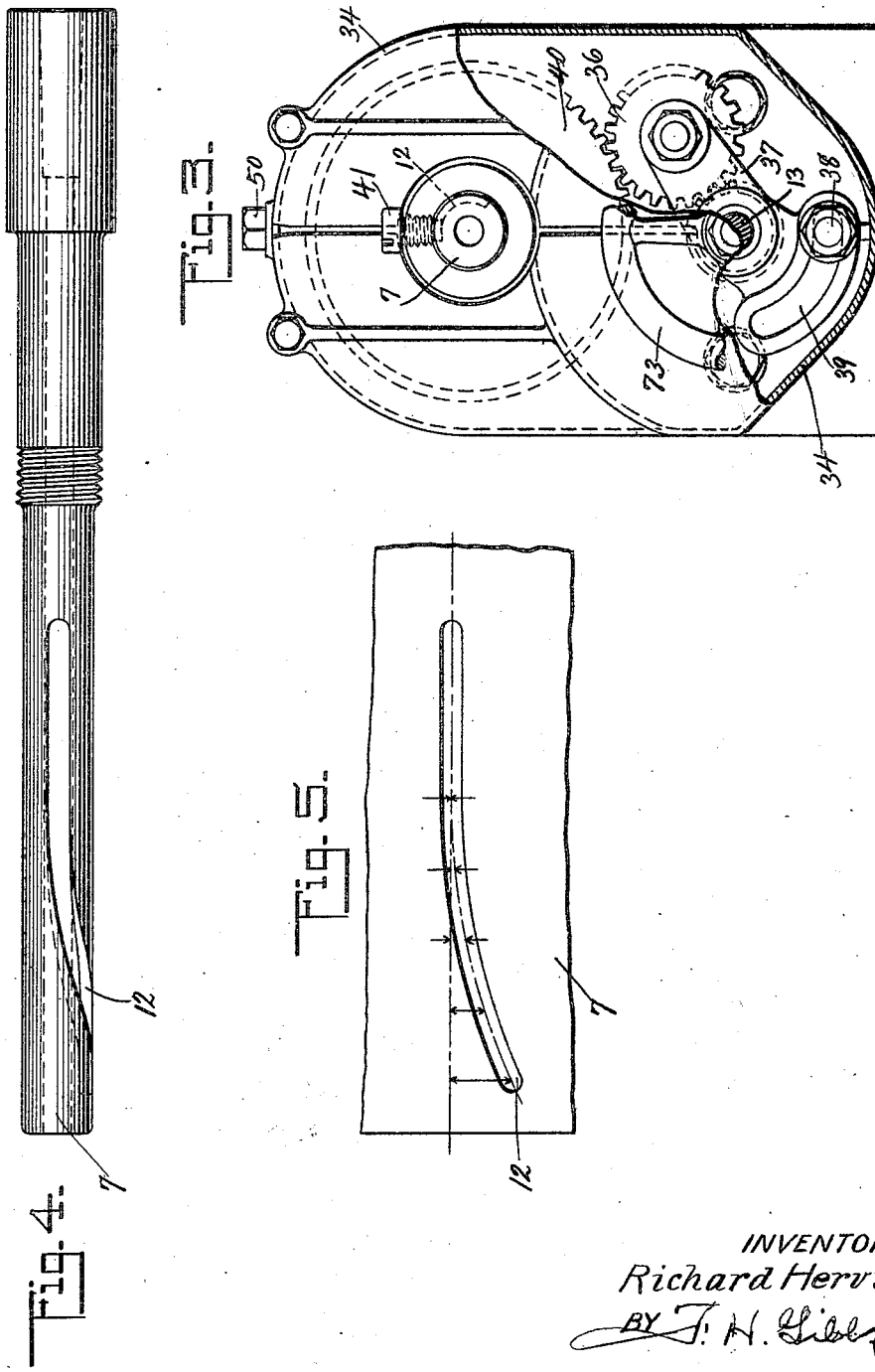
INVENTOR:
Richard Hervig
BY F. H. Libby
ATTORNEY.

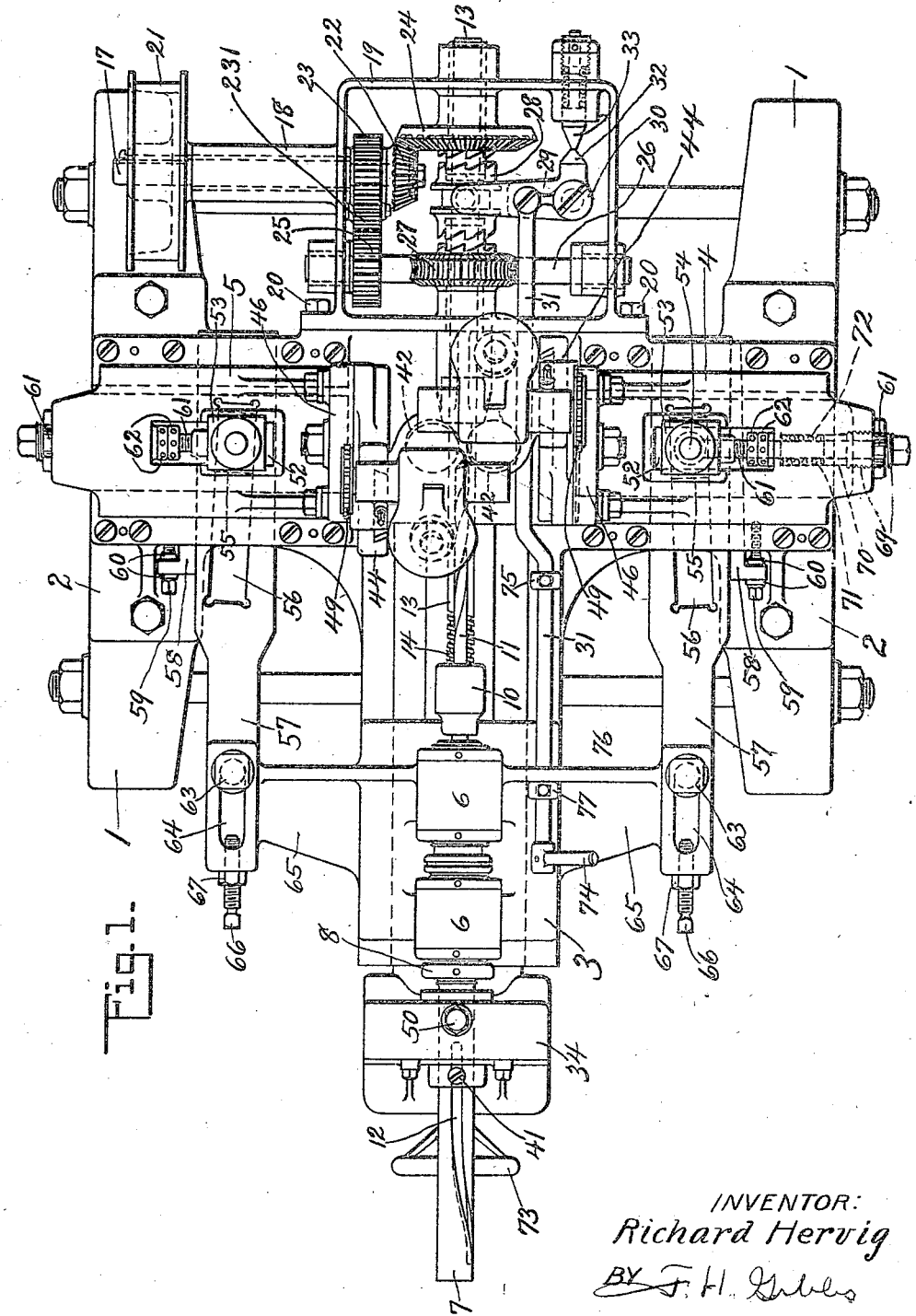

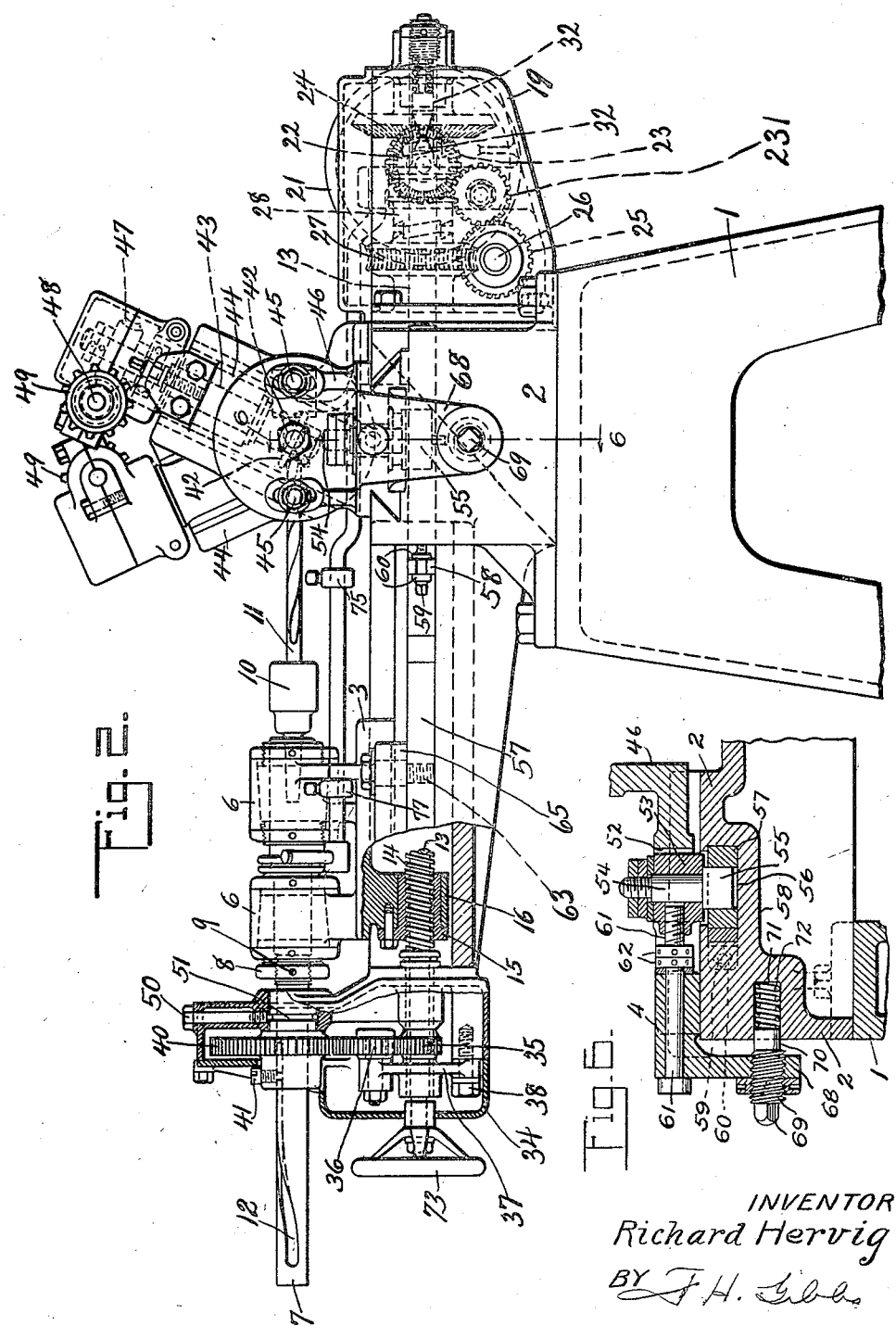

Patented Apr. 6, 1926.

1,579,317

UNITED STATES PATENT OFFICE.

RICHARD HERVIG, OF CHICAGO, ILLINOIS, ASSIGNOR TO AMERICAN CAR AND FOUNDRY COMPANY, OF NEW YORK, N. Y., A CORPORATION OF NEW JERSEY.

DRILL-FLUTE-MILLING MACHINE.

Application filed March 23, 1922. Serial No. 545,992.

*To all whom it may concern:*

Be it known that I, RICHARD HERVIG, residing at Chicago, Cook County, Illinois, and being a citizen of the United States, have invented certain new and useful Improvements in a Drill-Flute-Milling Machine, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a top plan view of my improved drill flute milling machine, the cover of a gear casing being removed to show details;

Fig. 2 is a front elevation of my improved machine, parts being broken away to show details;

Fig. 3 is an elevation, partly in section, of the head end of my improved machine;

Fig. 4 is a view of the head spindle showing the groove in the spindle that determines the twist of the drill flutes;

Fig. 5 is a view showing the groove of the head spindle developed on a plane surface to show more clearly the change in the degree of curvature of the groove; and Fig. 6 is a partial vertical section taken on the line 6—6 of Fig. 2.

It is the object of my invention to provide an improved machine for milling the flutes of twist drills and more particularly of drills having the degree of twist decrease as the distance from the point of the drill increases. It is also an object of my invention to provide a machine of the type described that may be readily changed to mill drills the flutes of which have a uniform or any desired twist.

With these and other objects in view, my invention comprises a machine having a support 1 upon which is carried a base 2 having guides on which a sliding head 3 carrying the blank, and cross slides 4 and 5 carrying the cutting tools are adapted to reciprocate, the guides for the cross slides 4 and 5 being at right angles to the guides for the head 3. The head 3 comprises a plurality of bearings 6 having a spindle 7 rotatably mounted therein but prevented from moving longitudinally in said bearings by a collar 8 threaded on the spindle 7 and locked in position thereon by a set screw 9. The spindle 7 is provided with a groove 12, as shown in Figs. 4 and 5, and is adapted to carry a chuck 10 in which a blank 11 is secured. The shape of the groove 12 will vary, being straight when it is desired to give the drill flutes a uniform twist diverging from a straight groove, as shown in Figs. 4 and 5, when it is desired to give the drill flutes a decreasing twist, or diverging in the opposite direction when it is desired to give the drill flutes an increasing twist. To change the machine to produce one or another of the types of drills indicated, it is only necessary to place in position in the bearings 6 a spindle 7 having a groove 12 of the proper shape.

To reciprocate the head 3 on the base 2 there is provided a shaft 13 rotatably mounted in bearings in the base 2, but fixed against longitudinal movement therein, and having a threaded portion 14 engaging in a threaded bushing 15 fixedly mounted in an opening in a downwardly projecting lug 16 that is formed integral with the head 3 and adapted to travel in an opening formed in the base 2. To operate the shaft 13 there is provided a shaft 17 mounted in a bearing 18 formed integral with a gear casing 19 that is secured to the base 2 by the bolts 20. The shaft 17, driven from any suitable source of power by a belt (not shown) that engages the pulley 21, has secured thereon gears 22 and 23, the gear 22 driving a gear 24 rotatably mounted on the shaft 13 while the gear 23 drives through an idle gear 231, a gear 25 keyed upon a worm shaft 26 mounted in bearings in the gear casing 19. Rotatably mounted upon the shaft 13 is a worm wheel 27 driven by the worm shaft 26. Slidably mounted upon the shaft 13, but keyed thereto so as to rotate therewith, is a clutch member 28 operated by a yoke 29 pivotally mounted, as at 30, in the gear casing 19. The yoke 29 is operated by a rod 31 extending from the yoke 29 towards the head 3 and is provided with an integral lug 32 engaged by a spring pressed plunger 33 that is adapted to hold the yoke 29 at the limit of its movement in both directions. When the yoke 29 is at the limit of its movement in one direction, the clutch member 28 is engaged with a cooperating clutch member formed integral with the worm gear 27 so that the shaft 13 is driven slowly, in the direction to bring the blank to the cutters, from the pulley 21 through shaft 27, gears 23, 231, and 25, worm shaft 26 and worm gear 27 and when the yoke 29 is at the limit of its movement in the opposite direction, the clutch member 28 is engaged with a cooperating clutch member formed integral with the gear 24 so that the shaft 13 is driven more rapidly, in the direction to return the blank from the cutters, from the pulley 21 through shaft 17 and gears 22 and 24.

To rotate the spindle 7 as the head 3 is moved on the base 2, the shaft 13 which extends into a gear casing 34 secured to the base 2, is provided with a gear 35 that engages with a gear 36 that is mounted on an arm 37 loosely mounted on the shaft 13 and held in adjusted position by a lock bolt 38 mounted in the casing 34 and engaging in a slot 39 in the arm 37. Engaging with the gear 36 is a gear 40 loosely mounted on the spindle 7 and having a set screw 41 provided with an end adapted to travel freely in the groove 12 in the spindle 7. The gear 40 is held in position in the casing 34 by a set screw 50 mounted in the casing and having an end adapted to move freely in a groove 51 in the hub of the gear 40. It will be seen, therefore, that as the shaft 13 is rotated to move the head 3, the gear 40 will be operated and will rotate the spindle 7 and blank 11, the extent of the rotation of the blank 11 being dependent upon the ratio of the gears 35 and 40 and the shape of the slot 12.

The flutes in the drill blanks are cut by a plurality of angularly disposed cutters 42 mounted on spindles 43 in casings 44 that are adjustably secured by bolts 45 to brackets 46 formed integral with the cross slides 4 and 5. The spindles 43 are provided with worm wheels 47 that are engaged by worm shafts 48 driven by sprockets 49. The sprockets 49 are driven by chains from a countershaft driven from any suitable source of power. Mounted in slots 52 in the cross slides 4 and 5 are blocks 53 provided with openings in which are secured bolts 54 having rectangular heads 55 adapted to travel in diverging slots 56 in members 57 which are mounted for reciprocatory movement in grooves in the base 2. In order to compensate for the wear of the members 57 in the grooves in the base 2, wedging members 58 are provided, the members 58 being held in adjusted positions by bolts 59 and lock nuts 60. The blocks 53 are adjusted in the slot 52 by means of the bolts 61 and are locked in adjusted positions by the lock nuts 62. The outer ends of the members 57 are provided with pins 63 which engage in slots 64 in arms 65 formed integral with the head 3 forming a lost motion connection between the arms 65 and the members 57. The arms 65 are provided with adjusting bolts 66 which project into the slots 64 and are held in adjusted positions by lock nuts 67.

The cross slides 4 and 5 are provided with an integral portion 68 having a threaded opening in which are mounted adjusting screws 69 having cylindrical portions 70 which project into openings 71 in the base 2 and engage springs 72 mounted in said openings. The springs 72 tend, through their engagement with the screws 69, to keep the cross slides 4 and 5 in their extreme outward positions. In the operation of my machine, with a blank 11 mounted in the chuck 10, the head 3 is moved forward by means of hand wheel 73 until the end of the blank 11 is positioned between the cutters 42. At this time the cutters 42 should be at the inner limit of their movement and if the depth of cut in the blanks is to decrease from the point of the blank the adjusting screw 66 should be in engagement with the pins 63. Rod 31 is thereupon operated by means of handle 74 to engage the clutch member 28 with the clutch member on the worm gear 27 so that the head 3 is moved forward slowly by the operation of the shaft 13 and the spindle 7 and blank 11 are, at the same time rotated by the gears 35, 36 and 40. As the blank 11 is moved forward and rotated, the operation of the cutters 42 cuts the flutes in the drill blank. As the head 3 moves forward, the arms 65, through the engagement of screw 66 with pin 63 moves the members 57 forward. As the members 57 move forward, the blocks 53, through the engagement of the bolts 54 in the diverging slots 55, are moved outwardly carrying with them the cross slides 4 and 5 and the cutters 42 so that the depth of the cut in the blank 11 will gradually decrease as the cut progresses. At the end of the forward movement of the head 3, a stop 75 on the rod 31 will be engaged by a flange 76 on the arm 65 and the rod 31 operated to shift the clutch member 28 so that it engages with the clutch member on the gear 24 whereupon the rotation of the shaft 13 will be reversed and the head 3 will be operated to quickly withdraw the blank 11 from between the cutters until the machine is stopped by the engagement of the flange 76 with a stop 77 or by manually operating the rod 31. At the start of the return movement of the head 3, the screw 66 is withdrawn from the pin 63 and the pin 63 travels in the slot 64 until it is engaged by the other end of the slot. This movement of the head 3 without a corresponding movement of the members 57 withdraws the blank 11 so that the cutters 42 do not engage in the groove and the subsequent movement of the members 57 by which the cutters 42 are moved does not place the cutters 42 in their extreme inner positions until after the blank 11 has been withdrawn beyond the point at which it would be engaged by the cutters.

What I claim is:

1. In a machine of the class described, a base, a head slidably mounted on said base, a work carrying spindle carried by said head, a threaded shaft engaging said head and adapted to shift said head and spindle, means operated by said shaft adapted to rotate said spindle, cross slides carrying cutters for work operated by the movement of said head and a connection between said spindle operating means and spindle adapted to vary the rotation of said spindle as said spindle is shifted.

2. In a machine of the class described, a base, a head slidably mounted on said base, a work carrying spindle carried by said head, a threaded shaft engaging said head and adapted to shift said head and spindle, means operated by said shaft adapted to rotate said spindle and a pin and slot connection between said spindle and spindle operating means adapted to vary the rotation of said spindle as said spindle is shifted.

3. In a machine of the class described, a movable head, a work carrying spindle mounted in said head, means for holding said spindle against longitudinal movement in the head, cross slides carrying cutters for the work, means to reciprocate said head and rotate said spindle in said head, means varying the rate of rotation of said spindle during movement of said head, and means operatively connecting said cross slides and head to operate said cross slides as said head is advanced, said connecting means being adapted to advance said cross slides after said head is partially retracted and said cutters disengaged from the work.

4. In a machine of the class described, a movable head, a work carrying spindle movable with said head, a threaded shaft adapted to move said head and spindle and rotate said spindle, cross slides carrying cutters for said work, slotted members operatively connected to said slides and lost motion connections between said head and members.

5. In a machine of the class described, a movable head, a work carrying spindle mounted in said head, means for holding said spindle against longitudinal movement in the head, means to reciprocate said head and spindle, cross slides carrying cutters for the work, operating means for said spindle adapted to vary the rotation of said spindle upon movement of said head and spindle and means operatively connecting said head and cross slides adapted to advance said cross slides after the work is partially retracted and disengaged from the cutters.

6. In a machine of the class described, a movable head, a work carrying spindle mounted in said head, means for holding said spindle against longitudinal movement in the head, cross slides carrying cutters for the work, means to advance said head and rotate said spindle in said head, means varying the rate of rotation of said spindle during the forward movement of said head, and means operatively connecting said head and cross slides to operate said cross slides as said head is advanced, said connecting means being adapted to permit an initial retraction of said head before advancing said cross slides.

7. In a machine of the class described, a movable head, a work carrying spindle rotatably mounted in said head, means to advance said head and spindle at a constant rate, said means being adapted to rotate said spindle in said head and a pin and slot connection between said means and spindle whereby advancing said spindle varies its rotation.

8. In a machine of the class described, a movable head, means to move said head movable cross slides, means comprising slotted members operated by head movement for moving said cross slides, arms carried by said head and lost motion connections between said arms and members.

9. In a machine of the class described a movable head, means to move said head, cross slides, reciprocating members to operate said cross slides from said head, means connecting said members to said head and a lost motion device in said means and means connecting said reciprocating means and head adapted to permit an initial movement of said head without operating said cross slides.

10. In a machine of the class described, a movable head, a work carrying spindle mounted in said head, means for holding said spindle against longitudinal movement in the head, means to reciprocate said head and rotate said spindle, means varying the rate of rotation of said spindle during movement of said head, a cross slide carrying a cutter for the work, an arm carried by said head, a member having a slot operatively engaging the cross slide and a lost motion connection between said arm and member permitting disengagement of the work from the cutter upon the initiation of the return movement of said head.

11. In a machine of the class described, a movable head, means to move said head, cross slides, members having diverging slots, means on said cross slides engaging in said slots, arms operated by said head and a lost motion connection between said arms and said members.

12. In a machine of the class described, a base, a head slidably mounted on said base, a slotted work carrying spindle carried by said head, means to advance said head and spindle and means engaging in the slot in said spindle adapted to rotate said spindle in said head, said slot being adapted to vary the rotation of said spindle as said spindle is advanced.

13. In a machine of the class described, a movable head, a slotted work carrying spindle in said head, a threaded shaft adapted to move said head, a gear having spindle operating means engaging in the spindle slot and operating means for said gear mounted on said shaft.

14. In a machine of the class described, a movable head, a work carrying spindle movable with said head, a threaded shaft, a connection between said shaft and head to cause movement of said head upon rotation of said shaft and a connection between said shaft and spindle to cause variable rotation of said spindle upon uniform rotation of said shaft.

15. In a machine of the class described, a movable head, a slotted work carrying spindle movable with said head, a threaded shaft, a connection between said shaft and head to cause movement of said head upon rotation of said shaft, a gear slidably mounted on said spindle and having means engaging in the slot in said spindle whereby said spindle is rotated, and a gear on said shaft operatively connected to the gear on said spindle, said spindle being given a variable rotation for a uniform rotation of said shaft.

16. In a machine of the class described, a movable head, a work carrying spindle mounted in said head, means to reciprocate said head and rotate said spindle, a cross slide carrying a cutter for the work, an arm carried by said head and a member connecting said arm and cross slide, said member having a slot determining the movement of said cross slide.

17. In a machine of the class described, a base, a head slidably mounted on said base, a spindle rotatably mounted in said head, means to advance said head and spindle at a uniform rate and rotate said spindle in said head and a pin and slot connection between said means and spindle whereby advancing said spindle varies its rotation.

In witness whereof I have hereunto set my hand.

RICHARD HERVIG.